United States Patent [19]

Rosenberg

[11] Patent Number: 5,171,433
[45] Date of Patent: Dec. 15, 1992

[54] BACK-FLUSHABLE FILTER

[76] Inventor: Peretz Rosenberg, Moshav Beit Shearim, Israel

[21] Appl. No.: 633,868

[22] Filed: Dec. 26, 1990

[30] Foreign Application Priority Data

Jan. 24, 1990 [IL] Israel .................................. 93160

[51] Int. Cl.⁵ .............................................. B01D 29/62
[52] U.S. Cl. .................................... 210/108; 210/232;
   210/333.01; 210/340; 210/392; 210/429
[58] Field of Search .................... 210/107, 108, 333.01,
   210/340, 346, 429, 232, 333.1, 392, 393

[56] References Cited

U.S. PATENT DOCUMENTS 4,601,826  7/1986  Christophe et al. ................ 210/340
4,806,217  2/1989  Rosenberg ......................... 210/232
5,024,763  6/1991  Schlaginhaufen ................... 210/340

Primary Examiner—Robert A. Dawson
Assistant Examiner—Wanda L. Millard
Attorney, Agent, or Firm—Benjamin J. Barish

[57] ABSTRACT

A filter device includes a tube connectible to a fluid line for the fluid to be filtered, and a housing enclosing the tube and including a partition dividing its internal chamber into two compartments each including a filter body. The housing and partition are movable axially of the tube to position the partition with respect to the inlet opening at: (a) a first position to cause both filter bodies to perform a filtering function, (b) a second position to cause the first filter body to perform a filtering function, or (c) a third position to cause the second filter body to perform a filtering function.

20 Claims, 4 Drawing Sheets

BACK-FLUSHABLE FILTER

FIELD AND BACKGROUND OF THE INVENTION

The present invention relates to back-flushable filters, namely filters wherein a back-flushing of the filter body is effected by applying pressurized fluid to the downsteam face of the filter body. The invention is particularly useful with respect to the back-flushable filter described in my U.S. Pat. No. 4,806,217, and is therefore described below with respect to that type of filter construction.

My U.S. Pat. No. 4,806,217 describes a filter device comprising a tube partially enclosed by a housing defining an internal chamber with the tube, and having a filter body within the internal chamber. In the normal position of the housing, the inlet receiving the pressurized fluid is applied to the upstream face of the filter body so that the filter operates in the conventional manner to separate particles from the fluid being filtered; but when the housing is moved in the axial direction, the inlet is applied to the downstream face of the filter body to thereby back-flush it in order to clean the filter body.

OBJECTS AND BRIEF SUMMARY OF THE INVENTION

An object of the present invention is to provide a filter device which may be back-flushed in order to clean the filter body without interrupting the normal filtering function of the filter.

According to the present invention, there is provided a filter device comprising: a tube connectible to a fluid line for the fluid to be filtered, and having an inlet opening therethrough at its inlet end, an outlet opening therethrough at its outlet end, and a plug between the inlet and outlet openings; a housing enclosing the tube and defining an internal chamber therewith, the housing including a partitition dividing the internal chamber into first and second compartments; a first filter body in the first compartment; and a second filter body in the second compartment. Each of the filter bodies has an upstream face adapted to communicate with the inlet opening on one side of the partition, and a downstream face adapted to communicate with the outlet opening. A passageway through the partition connects together the downstream sides of both compartments. The housing and partition are movable axially of the tube to position the partition with respect to the inlet opening at: (a) a first position, wherein the inlet opening is connected to the upstream side of both the compartments to cause both filter bodies to perform a filtering function; (b) a second position on one side of the first position, wherein the inlet opening is connected to the upstream side of only the first compartment to cause the first filter body to perform a filtering function, while filtered fluid at the downstream side of the first compartment is applied via the passageway to the downstream side of the second compartment; or (c) a third position on the opposite side of the first position wherein the inlet opening is connected to the upstream side of only the second compartment, to cause the second filter body to perform a filtering function, while filtered fluid at the downstream side of the second compartment is applied via the passageway to the downstream side of the first compartment.

The filter device further includes a normally-closed first valve which, when open, connects the upstream side of the first compartment to the atmosphere; a normally-closed second valve which, when open, connects the upstream side of the second compartment to the atmosphere; and means for opening the second valve in position (b) of the partition to effect a back-flushing of the second filter body, and for opening the first valve in position (c) of the partition to effect a back-flushing of the first filter body.

As will be more apparent from the description below, a filter constructed in accordance with the foregoing features may be cleaned by back-flushing whenever desired without interrupting its normal functioning as a filter.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
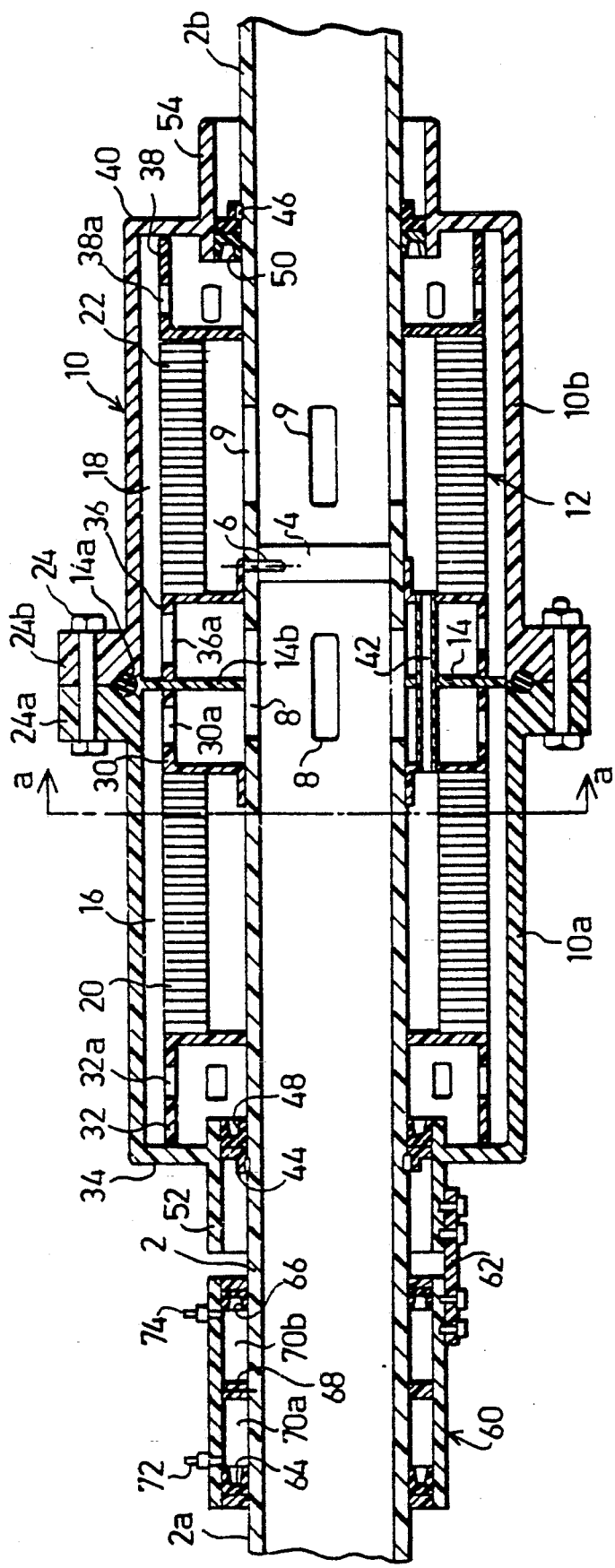
FIG. 1 is a longitudinal sectional view illustrating one form of filter device constructed in accordance with the present invention, the parts being shown in their normal positions during the normal operation of the filter device.
Figure 1A:
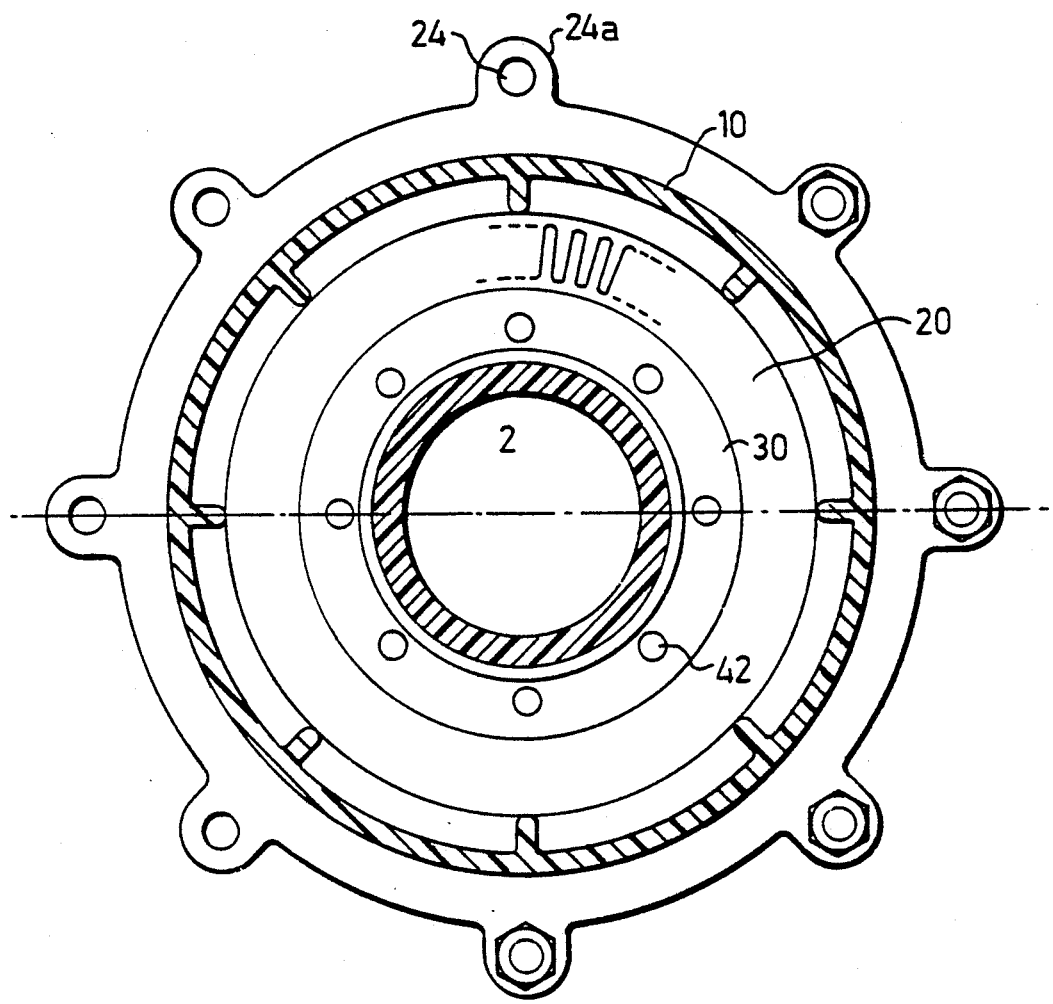
FIG. 1a is a transverse sectional view along line a—a of FIG. 1.

The filter device illustrated in the drawings is of a similar construction as that described in my U.S. Pat. No. 4,806,217. It comprises a central tube 2 having an inlet end 2a and an outlet end 2b connectible to the fluid supply line (e.g., a water irrigation line) carrying the fluid to be filtered. The central tube 2 includes a plug 4 fixed within the tube by a plurality of fasteners 6, an annular array of inlet openings 8 formed through the tube on one side of plug 4, and an annular array of outlet openings 9 formed through the tube on the opposite side of the plug. The inlet openings 8 and outlet openings 9 are all elongated in the axial direction.

The filter device further includes a cylindrical housing 10 enclosing the central tube 2 and of larger diameter than the tube so as to define an annular chamber, generally designated 12, between it and the tube. Housing 10 further includes an annular partition 14 dividing the annular chamber 12 into two compartments 16, 18. A first filter body 20 is disposed within compartment 16, and a second filter body 22 is disposed within compartment 18.

Cylindrical housing 10 is constituted of two sections 10a, 10b, secured together by a plurality of bolts 24 passing through annular flanges or tabs 24a, 24b formed on the confronting ends of the two housing sections. Each of the latter ends is formed with a semi-circular annular recess for receiving a bead 14a formed at the outer end of partition 14, so as to firmly support the main portion 14b of the annular partition 14 within the annular chamber 12, and thereby to divide the latter chamber into the two annular compartments 16 and 18.

Filter body 20 is fixed to housing 10 on one side of partition 14 by a first annular spacer member 30 secured to the partition, and by a second annular spacer member 32 secured to the respective end wall 34 of housing 10. Filter body 22 is similarly fixed to housing 10 by an annular spacer member 36 secured to the opposite side of partition 14, and by further annular spacer member 38 secured to the opposite end wall 40 of the housing.

Each of the above spacer members 30, 32, 36 and 38, includes an annular array of openings 30a, 32a, 36a and 38a, respectively, permitting the fluid to pass through the spacer members. In addition, a plurality of tubes 42 extend through the two spacer members 30, 36 on the opposite sides of the partition 14, and also through section 14b of the partition, to establish communication between the two compartments 16, 18 on the inner sides, constituting the downstream sides, of compartments 16, 18 containing the filter bodies 20, 22.

A pair of annular mounting rings 44, 46, each mounting a sealing ring 48, 50, are fixed to the central tube 2 so as to be in substantial alignment with the two end walls 34, 40 of housing 10 in the normal condition of the housing as illustrated in FIG. 1. Sealing rings 48, 50 cooperate with sleeves 52, 54 fixed to the inner ends of the end walls 34, 40 of housing 10 to define a valve at each end of the housing. In the normal condition of the housing 10 as illustrated in FIG. 1, both of the valves defined by sleeves 52, 54 cooperable with sealing rings 48, 50, are closed. When the housing 10 is moved axially with respect to tube 2 in the rightward direction (FIG. 2), sleeve 54 clears sealing ring 50 to open that end of the housing to the atmosphere; and when the housing is moved in the leftward direction (FIG. 3), sleeve 52 clears sealing ring 48 to open that end of the housing to the atmosphere.

Housing 10 may be moved manually in either direction with respect to the central tube 2. Preferably, the illustrated device includes a fluid drive, comprising a cylinder 60 mechanically coupled to the housing by a plate 62. Cylinder 60 carries a pair of sealing rings 64, 66 at its opposite ends engageable with the outer surface of the inlet end 2a of the central tube 2. An annular partition 68 is fixed to tube 2 and engages the inner surface of cylinder 60 so as to define two annular chambers 70a, 70b within cylinder 60. Cylinder 60 further includes an inlet/exit port 72 at one end, and an inlet/exit port 74 at the opposite end. The arrangement is such that inletting pressurized fluid via port 72 and outletting the fluid via port 74 will cause chamber 70a to expand moving cylinder 60 and housing 10, coupled thereto by plate 62, in the leftward direction; whereas inletting pressurized fluid via port 74 and exiting the fluid via port 72 will expand chamber 70b by moving both cylinder 60 and housing 10 in the rightward direction.

The two filter bodies 20, 22 may of any desired construction. Preferably, each includes a plurality of annular filter discs arranged as a stack, having ribbed side faces defining filtering passageways for filtering the fluid passing between the discs. It will be appreciated, however, that other filter bodies, such as the screen type, may also be used.

Figure 2:
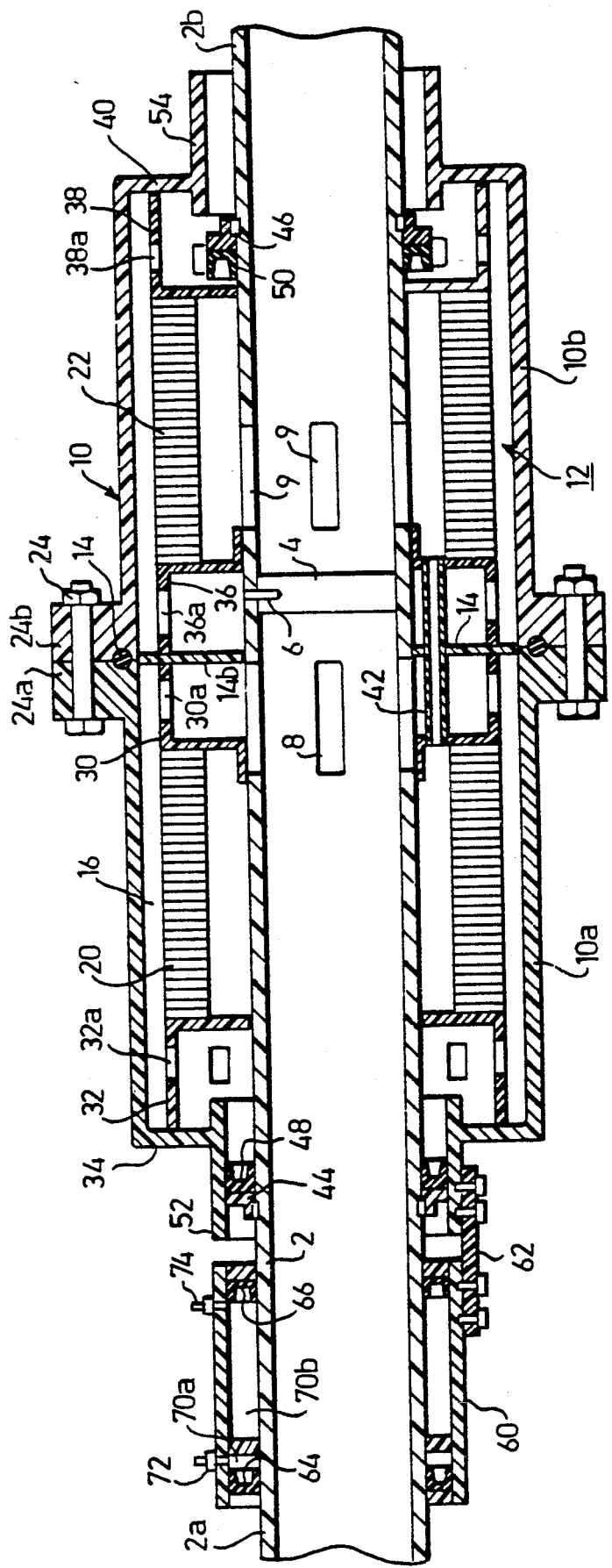
FIG. 2 is a view similar to that of FIG. 1 but showing the parts in their positions to effect a back-flushing of one of the filter bodies.
Figure 3:
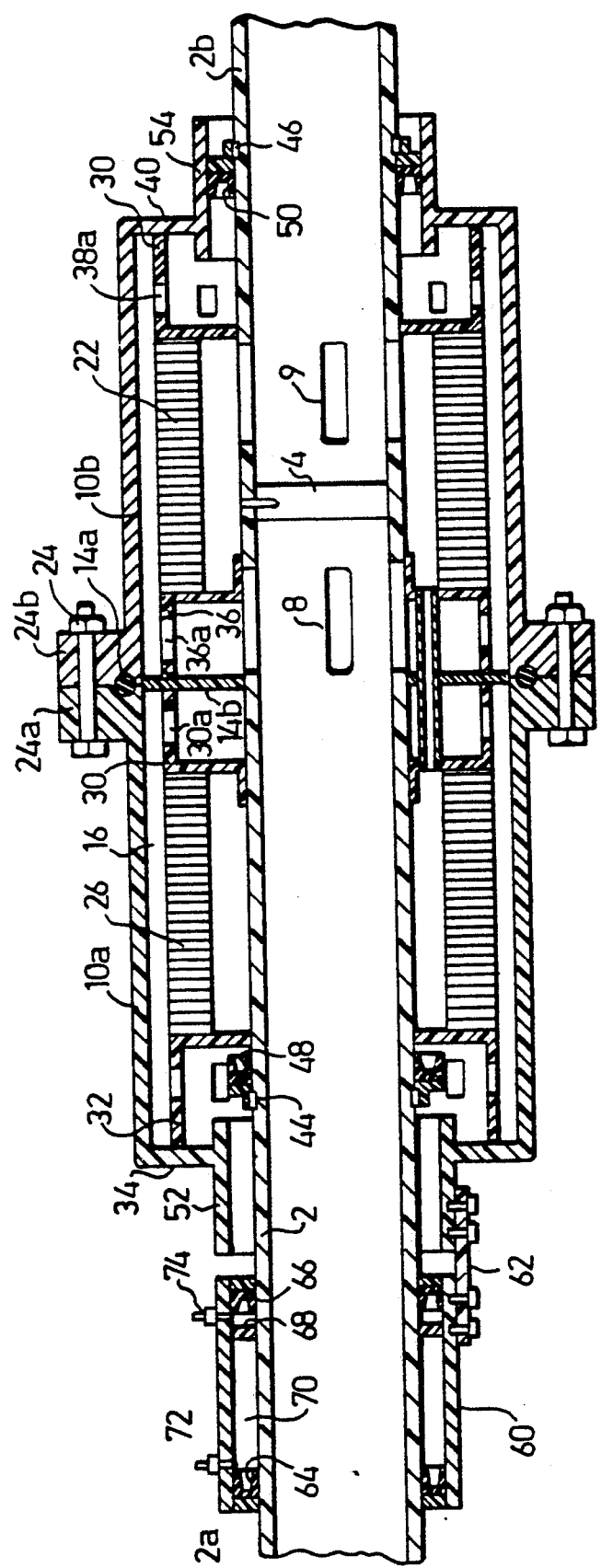
FIG. 3 is a view similar to that of FIG. 1, but showing the parts in their positions to effect a back-flushing of the other filter body.

The operation of the illustrated filter device will now be described particularly with reference to the three positions of housing 10, hereinafter called position (a), (b) and (c), as illustrated in FIGS. 1, 2 and 3, respectively.

FIG. 1 illustrates the housing 10 in position (a), which is the normal filtering position of the housing. In this position, partition 14 is located midway of the length of the elongated inlet openings 8. Thus, the pressurized fluid (e.g., water to be filtered) applied via inlet 2a is directed by plug 4 to flow through openings 8 into both of the filter compartments 18, 16 to the upstream (outer) face of both filter bodies 20, 22, through the filters, and out through the outlet openings 9, the filtered water from compartment 16 flowing to compartment 18 via the annular tubes 42. Accordingly, both filter bodies 20, 22 perform their normal filtering functions, separating the particles from the fluid. The separated particles accumulate on the upstream face of the two filter bodies, and between the two faces of their ribbed discs if such discs are used as the filter body. In this normal filtering position of housing 10, sleeves 52 and 54 at the ends of housing 10 engage the seals 48 and 50, respectively, fixed to tube 2, thereby preventing the discharge of any of the fluid from the upstream side of the two filter bodies 20, 22 to the atmosphere.

Whenever it is desired to back-flush one of the filter bodies, housing 10 is moved, either manually or by the drive cylinder 60, either rightwardly to the position (referred to as position b) illustrated in FIG. 2, or leftwardly to the position (referred to as position c) illustrated in FIG. 3.

In position (b) illustrated in FIG. 2, partition 14 is disposed on the right side of the inlet openings 8, thereby directing all the fluid to flow into the upstream side of compartment 16 containing filter body 20, through that filter body, through the annular array of tubes 42 to the downstream side of compartment 18 containing filter body 22, and through the outlet openings 9 to exit from the outlet end 2b of tube 2.

However, in this position of housing 10, its sleeve 54 at the right end of the housing has been moved to clear sealing ring 50, thereby opening to the atmosphere the upstream side of compartment 18 containing filter body 22. Accordingly, a part of the filtered fluid in the downstream side of compartment 18 will flow through filter body 22 to its upstream side, through openings 38a in spacer member 38, and out through the space between sleeves 54 and tube 2. Filter body 22 is thus back-flushed, while filter body 20 continues to perform its normal filtering function so that there is no interruption in the filtering operation.

Moving sleeve 10 leftwardly to the position illustrated in FIG. 3 (position c) moves the partition 14 to direct all the fluid flowing through the inlet openings 8 into compartment 18, whereby filter body 22 in that compartment performs its normal filtering function, the filtered fluid flowing out through the outlet openings 9. In this position of housing 10, sleeve 52 at the left end of the housing clears sealing ring 48, thereby opening the upstream side of compartment 16 to the atmosphere, so that the filtered fluid at the downstream side of compartment 18, flowing through the annular array of tubes 42, is applied under pressure to the downstream side of filter body 20 in compartment 16, and thereby back-flushes that filter body via openings 32a and the space between sleeve 52 and the tube 2. Accordingly, during the back-flushing of filter body 20, filter body 22 performs its normal filtering function, so that again there is no interruption in the normal filtering operation of the filter.

While the invention has been described with respect to one preferred embodiment, it will be appreciated that many variations, modifications and other applications of the invention may be made.

What is claimed is:

1. A filter device, comprising:
   a tube connectible to a fluid line for the fluid to be filtered, and having an inlet opening therethrough at its inlet end, an outlet opening therethrough at its outlet end, and a plug between said inlet and outlet openings;
   a housing enclosing said tube and defining an internal chamber therewith, said housing including a partition dividing the internal chamber into first and second compartments;
   a first filter body in said first compartment;
   a second filter body in said second compartment;
   each of said filter bodies having an upstream face adapted to communicate with said inlet opening on one side of the partition, and a downstream face adapted to communicate with said outlet opening;
   a passageway through said partition connecting together the downstream sides of both compartments;
   said housing and partition being movable axially of said tube to position said partition with respect to said inlet opening at:
   (a) a first position, wherein the inlet opening is connected to the upstream side of both said compartments to cause both filter bodies to perform a filtering function;
   (b) a second position on one side of said first position, wherein the inlet opening is connected to the upstream side of only said first compartment to cause the first filter body to perform a filtering function, while filtered fluid at the downstream side of the first compartment is applied via said passageway to the downstream side of said second compartment; or
   (c) a third position on the opposite side of said first position, wherein the inlet opening is connected to the upstream side of only said second compartment, to cause the second filter body to perform a filtering function, while filtered fluid at the downstream side of the second compartment is applied via said passageway to the downstream side of said first compartment;
   a normally-closed first valve which, when open, connects the upstream side of the first compartment to the atmosphere;
   a normally-closed second valve which, when open, connects the upstream side of said second compartment to the atmosphere;
   and means for opening said second valve in position (b) of the partition to effect a back-flushing of the second filter body, and for opening said first valve in position (c) of the partition to effect a back-flushing of said first filter body.

2. The filter device according to claim 1, wherein said first and second filter bodies are both of cylindrical configuration, and are disposed within said first and second compartments, respectively, with their outer surfaces spaced from the inner surface of the housing and constituting the upstream faces of the filter body, and their inner surfaces spaced from the outer surface of the tube and constituting the downstream faces of the filter bodies.

3. The filter device according to claim 1, wherein both said filter bodies are fixed to the housing and move therewith.

4. The filter device according to claim 3, wherein said first and second valves include sleeves fixed to the opposite ends of said housing and cooperable with seals fixed to the tube on opposite sides of said inlet and outlet openings.

5. The filter device according to claim 3, wherein said first and second filter bodies are spaced from said partition by spacer members fixed to said housing on opposite sides of said partition.

6. The filter device according to claim 5, wherein said passageway includes a conduit extending through said spacer members and partitions on the downstream side of said first and second compartments.

7. The filter device according to claim 6, wherein said first and second filter bodies are spaced from the ends of said housing by further spacer members fixed to said housing.

8. The filter device according to claim 7, wherein said further spacer members are each formed with an annular array of openings establishing communication between the upstream face of the respective filter body and the respective valve.

9. The filter device according to claim 7, wherein the inner face of said housing is formed with longitudinally-extending ribs engageable with the outer surfaces of said first and second filter bodies to define the upstream sides of said first and second compartments.

10. The filter device according to claim 1, wherein there are a plurality of inlet openings formed in an annular array around said tube on one side of said plug, and a plurality of outlet openings formed in an annular array around said tube on the opposite side of said plug.

11. The filter device according to claim 1, further including a fluid drive for moving said housing with respect to said tube, said fluid drive comprising a cylinder enclosing a part of said tube on one side of said housing, and carrying seals at the opposite ends, and a partition fixed to said tube to define two chambers between the tube, the two seals and the partition; said cylinder being mechanically coupled to said housing and including ports on opposite sides of said partition for applying pressurized fluid to a selected one of said chambers in order to move said cylinder, and the housing coupled thereto, with respect to said tube.

12. A filter device, comprising:
    a tube connectible to a fluid line for the fluid to be filtered, and having an inlet opening therethrough at its inlet end, an outlet opening therethrough at its outlet end, and a plug between said inlet and outlet openings;
    a housing enclosing said tube and defining an internal chamber therewith, said housing including a partition dividing the internal chamber into first and second compartments;
    a first filter body in said first compartment;
    a second filter body in said second compartment;
    each of said filter bodies having an upstream face adapted to communicate with said inlet opening on one side of the partition, and a downstream face adapted to communicate with said outlet opening;
    a passageway connecting together the downstream sides of both compartments;
    a normally-closed first valve which, when open, connects the upstream side of the first compartment to the atmosphere;
    a normally-closed second valve which, when open, connects the upstream side of said second compartment to the atmosphere;

and a fluid drive for moving said housing with respect to said tube, said fluid drive comprising a cylinder enclosing a part of said tube on one side of said housing, and carrying seals at the opposite ends, and a partition fixed to said tube to define two chambers between the tube, the two seals and the partition; said cylinder being mechanically coupled to said housing and including ports on opposite sides of said partition for applying pressurized fluid to a selected one of said chambers in order to move said cylinder, and the housing coupled thereto, with respect to said tube.

13. The filter device according to claim 12, wherein said first and second filter bodies are both of cylindrical configuration, and are disposed within said first and second compartments, respectively, with their outer surfaces spaced from the inner surface of the housing and constituting the upstream faces of the filter body, and their inner surfaces spaced from the outer surface of the tube and constituting the downstream faces of the filter bodies.

14. The filter device according to claim 13, wherein both said filter bodies are fixed to the housing and move therewith.

15. The filter device according to claim 14, wherein said first and second valves include sleeves fixed to the opposite ends of said housing and cooperable with seals fixed to the tube on opposite sides of said inlet and outlet openings.

16. The filter device according to claim 14, wherein said first and second filter bodies are spaced from said partition by spacer members fixed to said housing on opposite sides of said partition.

17. The filter device according to claim 16, wherein said passageway includes a conduit extending through said spacer members on the downstream side of said first and second compartments.

18. The filter device according to claim 17, wherein said first and second filter bodies are spaced from the ends of said housing by further spacer members fixed to said housing, said further spacer members each being formed with an annular array of openings establishing communication between the upstream face of the respective filter body and the respective valve.

19. The filter device according to claim 18, wherein the inner face of said housing is formed with longitudinally-extending ribs engageable with the outer surfaces of said first and second filter bodies to define the upstream sides of said first and second compartments.

20. The filter device according to claim 12, wherein there are a plurality of inlet openings formed in an annular array around said tube on one side of said plug, and a plurality of outlet openings formed in an annular array around said tube on the opposite side of said plug.

* * * * *